Patented Jan. 6, 1942

2,268,946

UNITED STATES PATENT OFFICE 2,268,946

PHENOL MODIFIED ETHERS

William Krumbhaar, New York, N. Y.

No Drawing. Application May 13, 1940,
Serial No. 334,977

8 Claims. (Cl. 260—613)

This invention relates to novel products particularly useful in the manufacture of synthetic condensation products such as resins, and is more particularly concerned with monomeric phenolic ether alcohols of high reactivity, more particularly when produced from monomolecular phenol methylol compounds such as phenol alcohols and polyhydric alcohols.

It is known to combine chemically ethylene glycol or glycerol with phenol alcohols, by heating the two compounds together in a sealed tube, or by heating the phenol compounds with halogenated poly-alcohols in the presence of catalysts. No monomeric phenolic ether alcohols are obtained in this manner in either case, the resulting substances being highly polymerized products of resinous character. It is also known to combine phenol formaldehyde condensates with glycerol or ethylene glycol by heating the condensates with an excess of such poly-alcohols. Neither in this process is a monomeric phenolic ether obtained, because due to the application of heat and the presence of catalysts, polymerization and resinification takes place.

It is common practice in the manufacture of phenol formaldehyde resins for molding purposes to apply glycerol or ethylene glycol as plasticizers, to use glycerol in order to obtain transparency or to employ it as fluxing agent in the purification process. However, in all these uses, conditions are such that monomeric compounds cannot be formed. Either resinified products are present at the very beginning of the reaction, or they are necessarily formed during the process under the conditions employed, as for example, due to the presence of catalysts, or due to the application of heat. In the production of synthetic resins for surface coating purposes, particularly of rosin modified phenolics, physical mixtures of glycerol and phenol alcohols are sometimes used, but monomolecular phenolic ether alcohols cannot be formed in these processes because the application of heat leads to self-condensation of the phenol alcohols, which destroys their ability to enter into etherification with glycerol.

Among the objects of the present invention is the production of monomeric reaction products of phenol methylol compounds with polyhydric alcohols.

Other objects and advantages will appear from the more detailed description set forth below, it being understood, however, that this more detailed description is given by way of illustration and explanation only and not by way of limitation, since various changes therein may be made by those skilled in the art without departing from the scope and spirit of the present invention.

In accordance with the present invention polymolecular or resinified products are substantially avoided, and monomeric products are produced of the character of monomeric phenolic ether alcohols. Desirably they are produced from monomolecular phenol methylol compounds with lower polyhydric alcohols reactive therewith such as glycerol or ethylene glycol. The conditions of reaction are such that polymolecular or resinified products are not obtained but the conditions are controlled to produce monomeric compounds. Such conditions are particularly advantageously those employing relatively low temperatures not exceeding 40° C. and high vacuum. Catalysts are not necessary and no catalyst should be present which tends to produce polymolecular derivatives.

The most desirable phenol ether alcohols produced in accordance with the present invention are those characterized by the fact that they contain more reactive hydroxyl groups per molecule than the components from which they were produced. The presence of a high number of reactive hydroxyl groups in the molecule makes the phenolic ether alcohols particularly valuable for conversion into other products, as for example, in the production of synthetic resins used in the manufacture particularly of surface coatings, because it has been estimated as a fundamental rule that the film forming properties of surface coating materials increase with the molecular size and the reactivity of the synthetic resins or related materials used in their production. The phenolic ether alcohols of the present invention accordingly give particularly valuable results for the stated purposes—results which cannot be obtained by the use of physical mixtures of the components. This is especially true regarding oil or rosin modified phenolics and with reference to phenol modified phthalics of maleics.

While the phenol methylol derivatives employed may be any monomeric compounds reactive to produce the products of the present invention, more desirably such monomeric phenol methylol compounds are produced for reaction with the desired polyhydric alcohols. For example, the phenols are converted into their alcohols by reaction with one or two mols of formaldehyde under conditions which lead to strictly monomolecular compounds. This is desirably carried out by conducting the reaction at relatively low temperature, preferably below 30° C. During the first period of reaction and not above 40° C. in the later stages. The phenol alcohols are precipitated from their alkaline solution by acidification, then washed carefully to eliminate acids which promote resinification, and dried at substantially room temperature. In this way monomolecular methylol compounds are obtained, which crystallize from their benzol solution in the form of white needles. Under practical conditions of production they are obtained in the form of thin oily liquids.

The monomolecular phenol alcohols utilized in the production of the phenolic ether alcohols of the present invention, are markedly different from the customary condensation products of phenols and formaldehyde. The customary products are benzine and oil soluble, whereas the phenol alcohols utilized in accordance with the present invention are on the contrary, insoluble in benzine, aliphatic hydrocarbons or turpentine, and insoluble in oils. Differing from the customary condensation products, the monomeric phenol alcohols used in accordance with the present invention for reaction with the lower polyhydric alcohols such as glycerol or ethylene glycol, are miscible with and soluble in such polyhydric alcohols. When such phenol alcohols are stored such as over a period of a few weeks, they gradually lose their monomolecular state due to internal condensation. Such change in character is evidenced by loss of solubility in glycerol and an acquired solubility in benzine and oil, they have at the same time become more viscous and gradually are converted into the customary type of condensation products. While this change in solubility occurs, there is a concomitant change in reactivity leading to a loss of reactivity with the polyhydric alcohols such as glycerol or ethylene glycol to the extent that such change has taken place. The prior art condensation products of phenols and formaldehyde are, therefore, unsuitable for the purposes of the present invention. The decrease in reactivity referred to above, is very pronounced even after a few days of storage so that for the purposes of the present invention the phenol alcohols should be used in monomeric condition and most desirably when freshly prepared. Actually the best results are obtained by the use of the monomeric phenol alcohols in their substantially pure crystallized form.

In carrying out the present invention to produce the phenolic ether alcohols, the desired polyhydric alcohols reactive with the phenol alcohols are dissolved in monomolecular phenol alcohols. The homogeneous solution thus produced is desirably subjected to vacuum treatment at room temperatures, under conditions of vacuum, temperature, catalysts, type and proportions of reactants to give monomeric reaction products. To exemplify such reacting conditions, the following considerations are noted.

Sufficiently high vacuum is required to induce the reaction; as a rule at least 10 mm. are necessary at 15°, 15 mm. at 20°, or 20 mm. at 25°. Under such conditions the reaction starts immediately and continues under heavy foaming. Water is split off during the reaction but no phenolic decomposition products are distilled off. The reaction depends entirely on sufficiently high vacuum; if the vacuum is decreased below the specified degree, the reactivity drops suddenly and can be promoted only by further slight increase in temperature. However, temperatures high enough to favor self-condensation should be strictly avoided. The practical limits of the reaction are about 30 mm., applied up to temperatures of 40° C. If the vacuum is decreased further, a rise in temperature will not produce the desired reaction. For instance, at a vacuum of 125 mm., the temperature is to be raised to 70° C. in order to cause some reactivity. The reaction, however, is not the etherification, but a plain self-condensation as evidenced by a test of the reaction product. If the mixture of phenol alcohol and polyhydric alcohol is heated without any vacuum, reactivity starts only at above 100° C., resulting in a resinification of phenol alcohols, evidenced by clouding of the mixture.

The formation of the phenolic ether alcohols, disclosed in this invention, takes place at the above specified degrees of temperatures and vacuum. Sometimes slight increase in temperature is desirable to accelerate the reaction in its final stage, particularly if an excess of glycerol is present. However, it always has to be kept in mind, that the essential feature of the process consists in carrying it out at low temperature, to avoid any self-condensation of the phenol alcohol. This is especially important for the first stage of the reaction.

To facilitate the etherification, the reactants should be as waterfree as possible. For instance, the phenol alcohols are preferably freed from mechanically admixed water by drying at low temperature under vacuum; the polyhydric alcohol, particularly the glycerol, is applied in the form of high gravity material. The customary dehydrating agents can be used in the process, but they are difficult to eliminate from the finished product. Reaction catalysts should be eliminated carefully, since they are liable to promote resinification.

The progress of the reaction under vacuum can be easily followed by taking samples and determining the amount of free glycerol which is taken out when the sample is shaken with water, or which settles from the solution when the sample is dissolved in benzol or toluol. The unreacted phenol alcohol, in addition, is characterized by its tendency to crystallize in white needles from the benzol solution. If not more than the maximum amount of glycerol is employed, and if the reaction is carried to completion, the product does not give off any glycerol to water, is completely soluble in benzol, and no crystallization takes place from the benzol solution.

The proportion of phenol alcohol and polyhydric alcohol in the reaction mixture is limited with regard to the amount of glycerol or ethylene glycol present. The maximum amount of glycerol or ethylene glycol combined chemically by the phenol alcohol are only one mol polyhydric alcohol on one mol phenol dihydric alcohol. If larger amounts of polyhydric alcohols are present in the reaction mixture the excess remains uncombined, and, if possible, an excess is avoided, because it retards reaction. Lower than the specified amounts readily form a homogeneous mixture, because the phenol ether alcohol is miscible with the phenol alcohol. As a rule, an excess of the phenolic component facilitates the etherification reaction.

The weights of phenol alcohols and polyhydric alcohols which enter into reaction with each other cannot be given with complete exactness, however, a series of tests with varying proportions, proves clearly that the weights are based on the reaction of one hydroxyl group of the polyhydric alcohol with one hydroxyl group of the phenol alcohol, i. e., equimolecular weights give the best results. A determination of the loss of water, split off during the reaction, also proves that as a rule one of the phenolic or alcoholic hydroxylic groups of the phenol alcohols links up by etherification with one hydroxyl group of the polyhydric alcohols, indicating that phenolic ether alcohols are formed. All of the evidence, therefore, indicates that the reaction products produced in accordance with the present invention are of etherified character; but regardless of any theoretical considerations, important and novel reaction products are obtained from the stated materials under the conditions given in the present specification.

Phenol monohydric alcohols enter into the same reaction as do phenol dihydric alcohols. However, the reaction products do not contain more hydroxyl groups per molecule than the constituents used in forming such reaction products and, therefore, are not particularly used in the preparation of coating composition components, but such reaction products may be used where it is not essential that they contain more hydroxyl groups per molecule than the constituents from which produced.

The phenols used as raw materials for the production of the phenolic ether alcohols should be those which give monomeric reaction products under the conditions referred to. For practical purposes the phenols utilized are limited to a few types. Phenol alcohols prepared from U. S. P. phenol or cresol do not react with glycerol or ethylene glycol under the conditions specified above, even when employed in strictly monomolecular form. Among the phenols with substituents of high molecular weight, only those phenols are employed which are soluble in glycerol and which can be converted into alcohols without resinification. Consequently the cyclo hexyl and phenyl phenols, as well as binuclear phenols of high melting points, are unsuitable for the purposes of the present invention.

The most important of the derivatives employed in accordance with the present invention are illustrated by the butyl and amyl substituted phenols, particularly para-tertiary butyl and amyl phenols.

The phenolic ether alcohols obtained from paratertiary butyl or amyl phenol in the process outlined above, are viscous liquids, soluble in aromatic hydrocarbons, insoluble in aliphatic hydrocarbons. On heating alone, they condense in themselves, giving off water. They can be heated without gelling or hardening to 200° C., and even after long heating above 200° C. they do not become insoluble or infusible. They are furthermore miscible with the phenol alcohols themselves, either monomeric or polymeric, such mixtures having unique properties due to the presence of the new type of phenol ether alcohols.

All these features make the phenol ether alcohols valuable in the production of synthetic resins, because they can be heat combined with resinous substances like estergum, phthalics, maleics, forming very resistant bodies. They are combinable also with all those constituents which enter into such resinous substances, particularly abietic acid, fatty acids, phthalic anhydride, maleic acid and the whole range of acidic resinifying compounds.

They may also be reacted with oils, as for instance, linseed oil, to form products particularly important in the production of phenol modified alkyd resins.

The main advantage of the monomolecular ether alcohols, as described in this application, for the purpose of the manufacture of synthetic resins, consists in their high reactivity with acidic substances, due to the comparatively large number of reactive hydroxyl groups in the molecule. This applies particularly to the resinous and fatty acids as well as to the other organic acids used in the manufacture of synthetic resins.

The following example will further explain the nature of the invention:

(1) A phenol dihydric alcohol is prepared by dissolving 200 parts of para-tertiary butyl phenol in 200 parts of a 6% caustic soda solution at 50° C., and adding slowly under cooling 275 parts 30% aqueous formaldehyde. The mixture is kept for 12 hours at 30° C. and 36 hours at 40° C., whereby the formation of the dihydric alcohol is practically complete. The latter is then set free by acidification, washed with water several times, and separated from all mechanically admixed water. In this way 300 parts of a slightly wet monomolecular liquid phenol alcohol are obtained, which is benzine and oil insoluble, but readily miscible with glycerol. This product, while still in monomeric condition, is now mixed cold with 110 parts of high gravity glycerol, and the mixture subjected to vacuum treatment at room temperature. As soon as the vacuum reaches 15 mm., a strong reaction with heavy foaming starts, and continues, the temperature cooling down to below 15° C. After the foam subsides, the temperature is increased gently in order to carry the reaction to completion. Finally 375 parts of a light colored oily phenolic ether alcohol are obtained.

(2) A phenol dihydric alcohol is prepared from one mol para-tertiary amyl phenol and two mols formaldehyde in the manner described in Example 1. 75 parts of the monomolecular product are mixed with 25 parts of ethylene glycol and the mixture subjected to vacuum treatment. At 25° C. and 10 mm. vacuum, a violent reaction takes place, which, after the strong foaming subsides, is carried to completion by bringing the temperature up to about 40° C., maintaining the vacuum below 20 mm. A homogeneous phenolic ether alcohol, insoluble in water, soluble in benzol, is obtained.

(3) A butyl phenol dihydric alcohol is prepared according to the method described in Example 1, and recrystallized from benzol. 72 parts of the white needles obtained in this way are homogeneously mixed with 28 parts of waterfree glycerol at 30° C., and the mixture is subjected to 10 mm. vacuum at the same temperature. The reaction starts and continues with heavy foaming, and is finished when the foam finally subsides, which occurs after 1–2 hours of vacuum treatment. An amount of 6–7% water is split off during the treatment. The pure phenolic ether alcohol obtained in this way, has a pleasant etherlike odor, and crystallizes in the form of white clusters.

(4) 150 parts of para-tertiary butyl phenol are reacted with 100 parts of 30% formaldehyde at low temperature using an alkaline catalyst. 80 parts of the liquid phenol monohydric alcohol obtained in this way are mixed with 20 parts of glycerol and subjected to vacuum treatment. The etherification starts at about 20° C. under a vacuum of 11 mm., and is finished at about 35° C. and 15 mm. The resulting ether alcohol is insoluble in water and completely soluble in benzol.

Having thus set forth my invention, I claim:

1. A reaction product of a monomeric alkyl phenol alcohol in which the alkyl group contains from 4 to 5 carbon atoms with a polyhydric alcohol reactive therewith to form a monomeric ether alcohol, said product being a monomeric phenolic ether alcohol soluble in aromatic hydrocarbons, insoluble in aliphatic hydrocarbons, on heating forming a condensation product which remains fusible and soluble, and exhibiting pronounced reactivity with acidic substances.

2. The method of producing reaction products which comprises preparing a monomeric alkyl phenol alcohol in which the alkyl group contains from 4 to 5 carbon atoms, and reacting said monomeric product with a polyhydric alcohol reactive therewith in vacuo under conditions to give a monomeric etherified alkyl phenol alcohol.

3. The method of producing reaction products which comprises preparing a monomeric alkyl phenol alcohol in which the alkyl group contains from 4 to 5 carbon atoms, and reacting said monomeric product with a polyhydric alcohol reactive therewith at a temperature below 40° C. and under high vacuum to give a monomeric etherified alkyl phenol alcohol.

4. The method of producing reaction products which comprises reacting an alkyl phenol in which the alkyl group contains from 4 to 5 carbon atoms with formaldehyde under conditions to produce a monomeric alkyl phenol dihydric alcohol and reacting such alkyl phenol dihydric alcohol while in monomeric condition with a polyhydric alcohol reactive therewith at a temperature below 40° C. under high vacuum to produce a monomeric etherified alkyl phenol alcohol.

5. The method of producing etherified phenol alcohols which comprises reacting a monomeric alkyl phenol alcohol with a polyhydric alcohol reactive therewith at a temperature below 40° C. under high vacuum until a monomeric etherified alkyl phenol alcohol is obtained.

6. The method of producing reaction products which comprises reacting a monomeric alkyl phenol dihydric alcohol with a polyhydric alcohol selected from the group consisting of glycerol and ethylene glycol at a temperature below 40° C. under high vacuum until a monomeric etherified alkyl phenol alcohol is obtained.

7. The method of producing reaction products which comprises reacting a para-tertiary butyl phenol dihydric alcohol with a polyhydric alcohol selected from the group consisting of glycerol and ethylene glycol at a temperature below 40° C. under high vacuum until a monomeric etherified alkyl phenol alcohol is obtained.

8. The method of producing reaction products which comprises reacting a para-tertiary amyl phenol dihydric alcohol with a polyhydric alcohol selected from the group consisting of glycerol and ethylene glycol at a temperature below 40° C. under high vacuum until a monomeric etherified alkyl phenol alcohol is obtained.

WILLIAM KRUMBHAAR.